Figure 1:
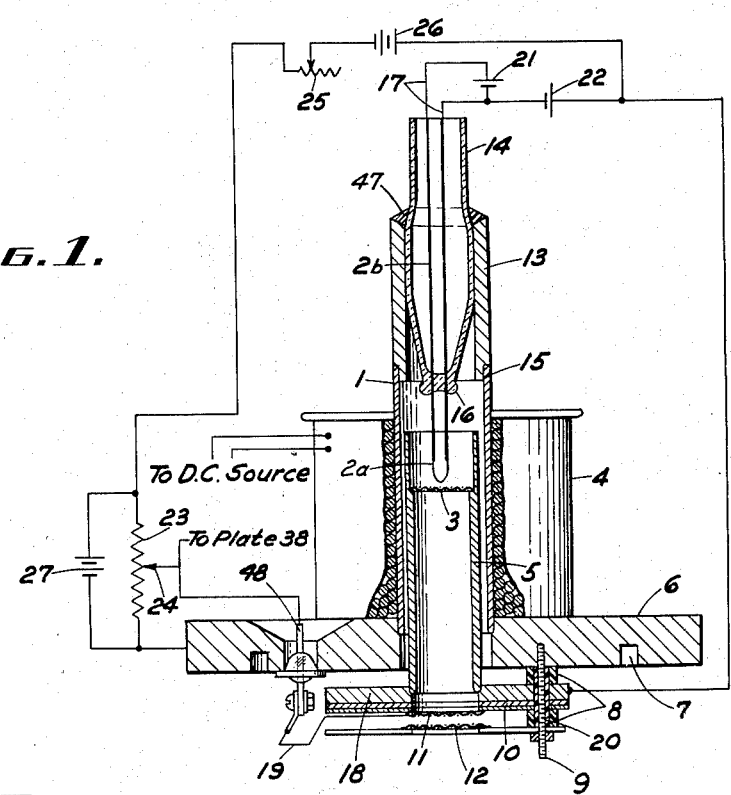

Aug. 7, 1951  F. S. STEIN ET AL  2,563,626
ION SOURCE
Filed April 12, 1948

INVENTORS
Frank S. Stein
BY John E. Binns
Carl R. A. Rice
Stanley Bashkin
ATTORNEY Patented Aug. 7, 1951

2,563,626

UNITED STATES PATENT OFFICE 2,563,626

ION SOURCE

Frank S. Stein, New York and John E. Binns, Upton, N. Y., and Carl R. A. Rice, Oak Ridge,, Tenn., and Stanley Bashkin, Madison, Wis., assignors to the United States of America as represented by the United States Atomic Energy Commission Application April 12, 1948, Serial No. 20,394

7 Claims. (Cl. 250—41.9)

Our invention relates to ion sources, and more particularly to an improved ion source which is useful in apparatus for the separation of elements, preferably such as apparatus for leak detection wherein helium is employed as the probe gas.

In the prior art of analyzing gases, particularly in leak detectors, it has been useful to employ the mass spectrometer or spectrograph wherein neutral vapors are subjected to electron bombardment in an ionizing chamber to produce ions, the ions are ejected from the ionizing chamber and are projected at high velocities into a magnetic field with accelerating potentials, causing them to travel in beams along arcuate paths of radii corresponding to their respective masses, and selectively collecting them on collector plates where they give up their charges so that the flow of current from the collector plate serves as a measure of the number of ions striking it.

In mass spectrometers employed for general analysis, it has been customary to inclose both the ion source and the collector in glass envelopes, so they are spaced apart from each other, but joined together through the extremities of an arcuate piece of flattened copper tubing which defines the main body through which the ion beams travel, and in which they are subjected to a magnetic or electrostatic field. The glass envelope of the source and of the collector, respectively, are sealed to the copper tubing.

The usefulness of the mass spectrometers of the prior art was, however, impaired by certain inherent defects in their construction, particularly in the arrangement of the ion source where the gases were ionized by electron bombardment. The ion current intensity was limited and the spectrometer through use became insensitive due to the formation of a black insulating carbonaceous deposit on the source, particularly on the anode which is subjected to electron bombardment. This action continues until the instrument becomes so insensitive that only the relatively large leaks can be detected. In order to restore the sensitivity of these instruments, the tedious procedure of dismantling, cleaning and reassembling such instruments at intervals ranging from about one to four weeks, was necessitated. In addition, this may pose an important glass blowing problem, where the source is inclosed in an evacuated glass envelope. It also requires considerable time for servicing, which results in the unavailability of the equipment for use during these periods.

Other objectionable features of the structures of the prior art resulting from the use of known ion sources were occasional instability of the output of the amplifier in the measuring circuits, because of the high gain required in measuring weak currents, such as currents as small as $10^{-14}$ amperes, bulkiness due to excessive electronic equipment, and unsatisfactory suppression of low energy ions.

Applicants with a knowledge of these defects in, and objections to the arrangements of the prior art have for an object of their invention the provision of an ion source which will develop a large ion current with narrow energy distribution by increasing the volume and area of bombardment so that ionization takes place along the whole path of travel.

Applicants have as another object of their invention the provision of an ion source with a circular beam, magnetically collimated, for producing greater ion current at the collector which permits greater stability in the operation of the measuring circuit.

Applicants have as another object of their invention the provision of an ion source for spiralling electrons to increase the lengths of their paths for greater ionization.

Applicants have as another object of their invention the provision of an ion source wherein the repelling effect of the ground field penetrating from above the source is employed to cause the ionizing electrons to move in the desired direction.

Applicants have as another object of their invention the provision of an ion source wherein the electron emission of the cathode is regulated through the space charge.

Applicants have as a further object of their invention the provision of an ion source which contemplates intensive bombardment of the anode by an electron beam from the cathode, and acts in conjunction with filament radiation to eliminate or obviate contamination of the anode arising from deposition of carbonaceous material thereon.

Applicants have as a further object of their invention the provision of an ion source having an anode including a screen-type electron collector which may be easily replaced.

Applicants have as a still further object of their invention the provision of an ion source which will continue to operate efficiently, free from contamination, and which will overcome the necessity for frequent dismantling and repair.

Applicants have as a still further object of their invention the provision of an ion source having cylindrical symmetry which insures ready centering and alignment of the electrodes, and facilitates dis-assembly and re-assembly of the source.

Other objects and advantages of our invention will appear from the following specification and accompanying drawings, and the novel features thereof will be particularly pointed out in the annexed claims.

Figure 2:
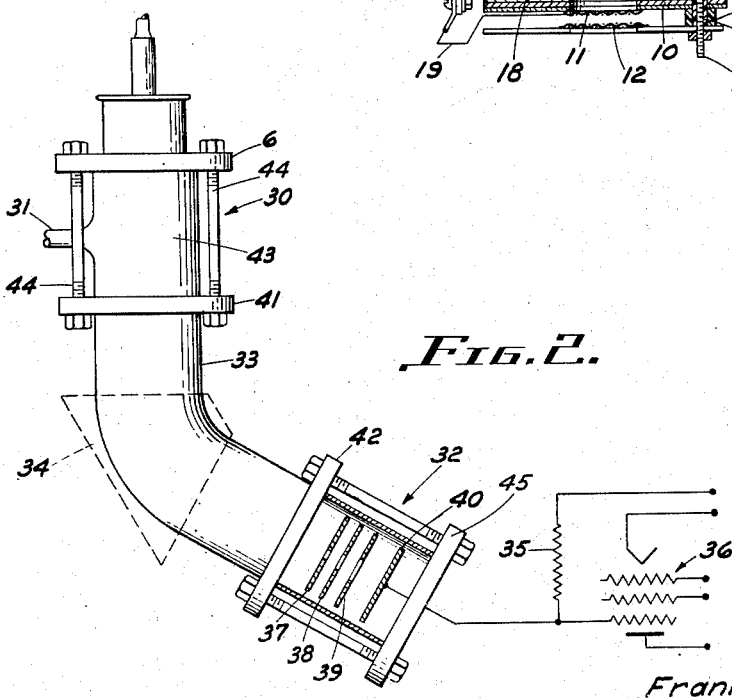

In the drawings, Fig. 1 is a fragmental sectional elevation of our improved ion source adapted for application to a mass spectrometer and including in diagrammatic form the general circuit connections. Fig. 2 is a schematic of the mass spectrometer with conventional coupling to an amplifier of the indicating system.

Referring to the drawings in detail, the source comprises an outer tubular jacket 1 which receives the reduced end of a tubular element 13, preferably of brass and is sealed thereto. The element 13 is cut away to define a shoulder. A glass stem 14 is then telescopically fitted into the tubular element 13, and sealed thereto, preferably with vacuum wax, as indicated at 47. The innermost tube 14 is drawn down at its lower extremity to form a mash or press 16 which serves to support and provide a gas-tight seal for the filament posts 2b which pass therethrough and extend upwardly to join leads 17, 17. The electrically heated V-shaped filament 2a carried by filament posts 2b reaches a short distance into the tubular anode 5 which is disposed within the jacket 1 in spaced relation thereto. The bore of the anode 5 is constricted by thickening of the walls beginning at a point a short distance below the upper end and extending to the lower end thereof, and a metal screen or mesh 3 is placed across the bore thereof at the point of constriction, the upper edge of the constricted portion serving as a support for screen 3. The position of the grid 3 is slightly below the end of the filament or cathode 2b to prevent a space charge from developing about the filament.

The jacket 1 is maintained at ground potential. It is constructed so as to be vacuum-tight and may be joined to the spectrometer tube or analyzer jacket by a tongue and groove connection at the point indicated by the annular groove 7 of the flange 6 which is secured to and/or carried by the lower extremity of jacket 1.

The lower end of anode 5 terminates in a flange or disc element 18. The first accelerator grid 11 is of wire mesh material and of circular configuration. It is mounted beneath the disc or flange 18 and across the lower circular exit or mouth of the anode. It is insulated from the anode 5 by a mica plate 10 and its potential is established and maintained by lead 19 which runs to the glass-sealed terminal 48 mounted on and insulated from flange or base 6. The second accelerator grid 12 is grounded on the base 6 and jacket 1 through the stud 9, which with two other similar studs serves as a mounting therefor. This second grid is of screen mesh material and is aligned with the mouth of the anode 5 and the first accelerator grid 11. The upper and lower insulators 8 and the insulating bushing 20 serves to insulate accelerator grid 11 from the base 6 and accelerator grid 12 from the anode 5 so that both the anode and grid 11 may be independently raised above the potential of screen 12 and jacket 1 which are at ground potential.

A coil in the form of a solenoid 4 is disposed externally about the jacket 1 to provide a magnetic field which threads it axially. This tends to reduce jacket sizes and leads to general convenience. While a power source with appropriate power transformer, rectifier and voltage dividers may be employed to furnish the necessary potentials, detailed circuit connections have been omitted, since only three electrodes and the filament need be supplied, and the equipment employed for such purpose is both conventional and relatively simple. Emission regulator circuits are unnecessary since the space charge effectively regulates the emission. Accordingly, the power sources disclosed are simply diagrammatic and illustrative, being well known in the art, and no invention is claimed in any of these arrangements.

Heater current for cathode 2a is supplied from source 21 which is shown as a conventional battery, but may be any other appropriate source. A source 22 of direct current power serves to provide a difference of potential between the anode 5 and cathode 2a. The direct current power source 27 for the accelerating electrodes may feed into a voltage divider 23 so that with the cooperation of source 26 the anode 5 may be maintained at a positive potential above the case or jacket 1, and the second accelerating electrode 12. The first accelerating electrode 11 may be maintained at an intermediate potential by means of a supplemental power source 26 and the adjustable tap 25, thereby providing the appropriate potential gradient. The accelerating potential is also adjusted by tap 24 of voltage divider 23 so as to peak the desired ion beam. To assist in maintaining the proper potential gradient between electrodes a source 26 of direct current potential referred to above may be inserted in series with the voltage divider 25.

Electrons emitted from the heated filaments 2a are attracted to the grid 3 below the filament and by the anode 5 and are strongly repelled by the ground field which penetrates from above the filament. Electrons do not reach the wall of the anode 5, however, because the force exerted on them in crossing the lines of flux of the magnetic field set up by solenoid 4 along the longitudinal axis of the anode causes them to spiral into a small cylindrical volume at the core of the anode. The three fields act together to impart a longer path to the electrons thereby increasing the probability of collision with molecules of the gas, with resulting increased ionization. With a more intense electron beam greater ionization results, since ionization may take place anywhere along the extended electron paths. The ions produced are similarly spiralled into a small cylindrical volume while being accelerated toward the analyzer by the accelerator grids 11, 12. The ions are thus collimated into an ion beam of greater cross section and intensity than that developed by conventional sources. While the ion exit is circular, advantages flowing from the selection of this configuration are secondary. The circular exit is necessitated by the fact that a solenoid is disposed about the ionization chamber which collimates the ions into a circular beam with greater ion current.

Fig. 2 shows our improved ion source incorporated into a mass spectrometer wherein 30 designates generally the envelope for the ion source with the inlet line 31 for feeding neutral vapors to the source, extending into the side of the envelope. The collector assembly is generally designated 32 and is spaced from the source 30 but is joined thereto through a curved piece of tubing, preferably of brass, and generally designated 33. A portion of the tubing 33 is subjected to the action of a magnetic field which passes therethrough at substantially right angles to the principal axis thereof, and which is set up by a magnetic field structure 34 preferably of the type described by Smythe, Rumbaugh and West in vol. 45 of Physical Review, wherein the pole pieces are bounded by arcs of circles rather than straight edges.

The tube assembly facilitates dismantling and reassembling when necessary. On opposite ends of tube 33 are mounted grooved flanged elements 41 and 42. Into the annular groove of flanged element 41 is seated a substantially cylindrical element 43 which has a side arm 31, referred to above, that serves to admit the neutral vapors, provide a pumping channel for vacuum purposes, and support the structure. On the opposite end of cylinder 43 rests flange 6 upon which the source is mounted. Annular rubber gaskets may be seated in the annular grooves of flanges 6, 41 allowing compression seals to be effected between the flanges and the ends of cylinder 43, with the aid of a plurality of bolts 44, 44 which span the pair of flanges. The envelope inclosing the collector assembly 32 is similar to that employed in connection with the source described above.

While the collector assembly may be of conventional type a preferred form includes three circular metal plates 37, 38, 39 having successively larger rectangular apertures at their centers. They are preferably spaced at 3 mm. intervals, mounted on flange 45 adjacent the exit end of the spectrometer and electrically insulated from each other. The electrode 37 provides a collector slit. This is followed by the suppressor plate 38 maintained at substantially the same potential as accelerating grid 11, and a grounded shield plate 39, behind which a rectangular metal plate 40 serves as the ion source collector. The need for the suppressor may be attributed to pressure scattering. This causes the simultaneous collection of ions of various $e/m$ ratios, so that when no helium is in the system an output reading may appear even though the voltage is such that only helium ions should be collected. By setting the suppressor and accelerating grid at the same potential, this objection may be effectively overcome since the undesirable ions will not have sufficient energy to penetrate the suppressor retarding field. If desired, several fine wires spot welded across its slit may serve to increase the efficiency of the suppressor. For simplicity of disclosure, the various connections and the supporting structure for plates 37 through 40, have been omitted from the drawings.

The collector plate is coupled through an appropriate resistor to several stages of amplification depending on the amplifying circuit. Pentode tube 36 serves as the initial amplifier and is preferably fed through its suppressor grid and coupled in a conventional manner to the other stages of amplification.

As generally indicated, heretofore, a concentrated circular beam of ions is produced by bombardment of neutral vapors by electrons under the influence of a collimating magnetic field in the cylindrical ionization chamber. It will, of course, be understood that neutral vapors are supplied to the ionization chamber by diffusion after being fed into the source through line 31. The singular beam of ions passing through tube 33 into the magnetic field set up by the field structure 34 is bent to provide a plurality of arcuate beams of radii corresponding to the respective masses of the ions, and a collector plate 40 of the collector assembly 32 positioned in the path of the desired beam may be employed to translate the ion current through a coupling resistor 35 and the amplifying system, including pentode 36 to a meter (not shown) for measurement.

The ion current to the collector has been increased over that in the usual sector type mass spectrometer by a factor of about 20. A less sensitive, and therefore more stable amplifier, may thus be used while retaining a sufficiently high sensitivity.

The amplifying system customarily employs a resistor 35 of about $10^{11}$ ohms. However, by employing my improved ion source with its concentrated beam, it is possible to reduce the size of this resistor to an order of magnitude of about $10^{10}$ ohms, which lends greater stability without sacrifice of sensitivity in the circuit.

The concentrated electron beam, employed herein, as distinguished from the scattered electron beams of the prior art, is employed to bombard the screen or plate 3 and keep it clean. If screen 3 is operated hot enough, contamination is overcome since carbonaceous material and other contamination is burned off as rapidly as it is formed. Filament emission is prefectly established by space-charge regulation, with no apparent shortening in filament life. In operation the solenoid may produce a magnetic field of about 700 oersteds dissipating 712 watts at 42 volts; this imposes upon the 140 volt filament electrons a radius of curvature of approximately 2 mm. A 15 volt field between the center grid 11 and the anode 5 serves to draw out the positive ions formed therein; the ions then receive a further acceleration of 640 volts between the two closely spaced grids 11, 12 when the mass spectrometer is adjusted for helium.

Having thus described our invention, we claim:

1. An ion source of the character described comprising a tubular anode defining an ionization chamber, a cathode positioned in the anode at one and thereof in spaced relation thereto for emitting electrons, a grid seated in an intermediate portion of said anode and beyond the cathode for cooperation with the anode to attract electrons therefrom, and means for setting up a magnetic field threading the anode for spiraling the electrons in their movement to increase ionization.

2. An ion source of the character described comprising an elongated tubular anode defining an ionization chamber, a heated cathode positioned in one end of the anode in spaced relation thereto for emitting electrons, a grid seated in said anode across its bore and adjacent the cathode for cooperation with the anode to attract electrons from the cathode and means providing a magnetic field threading the anode for spiraling the electrons in their movement to increase ionization.

3. An ion source of the character described comprising a tubular anode defining an ionization chamber, a heated cathode disposed within the anode and spaced therefrom for emitting electrons, a screen positioned across the bore of said anode adjacent the cathode for cooperation therewith to attract the electrons from the cathode, and a solenoid about said anode for setting up a field in said anode to spiral the electrons in their movement.

4. An ion source of the character described comprising an elongated tubular anode for defining an ionization chamber, a heated cathode disposed within the anode adjacent one end thereof, a screen extending across the bore of the anode adjacent the cathode for cooperation with the anode to attract electrons from the cathode, and means for setting up a magnetic field to thread the anode to spiral the electrons in their movement.

5. An ion source of the character described comprising an elongated tubular anode for defining an ionization chamber, a heated cathode disposed centrally therein adjacent one end thereof for emitting electrons, a screen extending across the bore of the anode adjacent the cathode for cooperation with said anode to attract electrons emitted by said cathode, and a solenoid disposed about the anode for setting up a magnetic field along the anode to spiral the electrons in their movement and increase ionization.

6. An ion source of the character described comprising an elongated tubular anode for defining an ionization chamber, a heated cathode disposed in said anode for emitting electrons, a screen positioned in said anode in crosswise-relation and in contact with the walls thereof, said screen being located adjacent the cathode for cooperation with the anode to attract electrons emitted by said cathode, and means for setting up a magnetic field to thread the anode for spiraling the electrons in their movement to increase ionization.

7. An ion source of the character described comprising an elongated tubular anode for defining an ionization chamber, a heated cathode disposed within the anode adjacent one end thereof, a grid positioned in contact with the walls and extending across the bore of the anode adjacent the cathode for attracting electrons emitted therefrom to ionize the gases in the ionization chamber, an accelerating electrode adjacent the other end of the anode for removing the ions therefrom, and means for setting up a magnetic field to thread the ionization chamber for spiraling the electrons in their movement and for collimating the ions.

FRANK S. STEIN.
JOHN E. BINNS.
CARL R. A. RICE.
STANLEY BASHKIN.

REFERENCES CITED

The following references are of record in the file of this patent:

UNITED STATES PATENTS

| Number | Name | Date |
|---|---|---|
| 1,816,682 | Langmuir | July 28, 1931 |
| 2,197,079 | Penning | Apr. 16, 1948 |
| 2,370,673 | Langmuir | Mar. 6, 1945 |
| 2,427,484 | West | Sept. 16, 1947 |
| 2,431,887 | Penning | Dec. 2, 1947 |

OTHER REFERENCES

McMillan et al.: Physical Review, vol. 56, 1939, p. 836.

Nier: Review of Scientific Instruments, June 1947, vol. 18, pp. 398–400.